(12) United States Patent
Dalton, Jr. et al.

(10) Patent No.: US 7,533,684 B1
(45) Date of Patent: May 19, 2009

(54) DISPENSING VALVE WITH BACK FLOW PROTECTION

(75) Inventors: Richard L. Dalton, Jr., Howell, MI (US); Scott A. Weickel, Highland, MI (US)

(73) Assignee: Numatics, Incorporated, Novi, MI (US)

( * ) Notice: Subject to any disclaimer, the term of this patent is extended or adjusted under 35 U.S.C. 154(b) by 552 days.

(21) Appl. No.: 11/253,323

(22) Filed: Oct. 19, 2005

(51) Int. Cl.
*F16K 11/10* (2006.01)

(52) U.S. Cl. .................. 137/240; 137/606; 137/859

(58) Field of Classification Search .......... 137/606, 137/859, 884, 607, 240
See application file for complete search history.

(56) References Cited

U.S. PATENT DOCUMENTS

| 825,370 A | 7/1906 | Zurbuch |
| 2,121,549 A * | 6/1938 | Meneal .................. 137/496 |
| 2,377,473 A | 6/1945 | Wolcott |
| 2,410,132 A * | 10/1946 | Smisko .................. 188/351 |
| 2,593,733 A | 4/1952 | Davies |
| 2,840,109 A | 6/1958 | Wadleigh |
| 2,888,098 A | 5/1959 | Florence |
| 2,924,207 A | 2/1960 | Hottenroth |
| 2,979,963 A | 4/1961 | Snoy |
| 3,633,621 A | 1/1972 | Myers |
| 3,724,487 A | 4/1973 | Hunter |
| 3,837,360 A | 9/1974 | Bubula |
| 4,163,523 A * | 8/1979 | Vincent .................. 137/606 |
| 4,294,285 A | 10/1981 | Joslyn |
| 4,306,587 A * | 12/1981 | Tchebinyayeff .......... 137/606 |
| 4,316,480 A | 2/1982 | Kah, Jr. |
| 4,410,001 A | 10/1983 | Goguen |
| 4,741,354 A * | 5/1988 | DeMild, Jr. .............. 137/240 |
| 5,056,549 A | 10/1991 | Bouilloux et al. |
| 5,975,134 A * | 11/1999 | Schwelm .............. 137/596.15 |
| 6,367,504 B1 | 4/2002 | Knapp |
| 2005/0121103 A1 * | 6/2005 | Steigerwalt et al. ....... 141/100 |

* cited by examiner

*Primary Examiner*—Stephen M Hepperle
(74) *Attorney, Agent, or Firm*—Reising Ethington P.C.

(57) ABSTRACT

A dispensing valve assembly with a housing having a plurality of inlet passageways connectable at a respective upstream end to a respective supply source. Each inlet passageway is in communication with a pressure responsive valve element. The valve element is biased to abut a discharge valve seat in a closed position about an upstream end of an outlet passage. The valve element is moveable to an open position when pressure in its respective inlet passageway exceeds a predetermined value. Each outlet passage is in fluid communication with a common dispensing outlet.

13 Claims, 3 Drawing Sheets

DISPENSING VALVE WITH BACK FLOW PROTECTION

TECHNICAL FIELD

This invention relates to a backflow prevention valve and more particularly to a dispensing valve with backflow prevention.

BACKGROUND OF THE INVENTION

Vending machines have long been popular for dispensing food snacks because of the convenience. At first, vending machines were limited to dispensing packaged goods but have now been developed for dispensing goods that are prepared at the vending machine such as hot coffee, and chocolate. The trend continues to provide vending machines that mix and make the food product on demand rather than merely dispensing prepared and stored products. By mixing and making the product at the vending machine, a wider selection of flavors and choices are possible than from a vending machine that stores limited inventory of prepared products.

When such products are made on demand, valves need to control the addition of various flavors to the base ingredient. For example, flavored syrup added to a base ice-cream is usually provided in liquid form. Displacement pumps and control valves need to control the addition of such different flavored syrups. Back flow prevention valves are also needed to prevent air from back flowing into the supply line to contaminate the supply. Previous valves were overly complex and often resulted in intermixing of different flavors. Known selector valves that rotate from one inlet to another and have a null or off position tend to get gummed up and stuck when viscous sugary fluids are used as the sugar crystallizes in the valve.

What is needed is a dispensing valve that can control the flow of multiple supplies such as different flavors and be closeable and provide for a quick cleaning of the common downstream passages that receive the flow of a different supply with each dispensing. What is also needed is a valve capable of supplying a plurality of liquids with no rotary selector valve that provides for backflow prevention for preventing crystallization of any liquid syrups.

SUMMARY OF THE INVENTION

In accordance with one aspect of the invention, a dispensing valve assembly with back flow protection has a housing having a plurality of inlet passageways connectable at a respective upstream end to a respective supply source. Each inlet passageway is in communication with a pressure responsive valve element. Each valve element is biased to abut a discharge valve seat in a closed position about an upstream end of an outlet passage. The valve element is moveable to an open position when pressure in the respective inlet passageway exceeds a predetermined value. Each outlet passage is in fluid communication with a common dispensing outlet.

In one embodiment, the valve element is in the form of a diaphragm. The inlet passageways terminate at and are in fluid communication with a pressure chamber that seats the diaphragm. The diaphragm has its outer periphery mounted between two seating shoulders of the housing. The pressure chamber also seats the discharge valve seat. It is further desirable that the housing is constructed such that the common dispensing outlet is at an axial end of the housing. Desirably, the plurality of inlet passageways are circumferentially spaced about the common dispensing outlet and radially extend outwardly transversely therefrom. The distances from the common dispensing outlet to the respective upstream ends of the outlet passages are approximately equal.

In one embodiment, pairs of pressure chambers are circumferentially spaced about in the housing with each pressure chamber in a respective pair being axially spaced from each other with a pair of passageways interposed between each of the pairs of axially spaced pressure chambers.

In accordance with another aspect of the invention, a dispensing valve with back flow prevention has a housing with a common dispensing outlet. A plurality of diaphragm backflow prevention valves has a discharge outlet in fluid communication with the common dispensing outlet and an inlet in communication with separate supply ports. Preferably, the housing includes a manifold plate, a spring cup retainer plate on each axial side of the manifold plate, and a cup plate that abuts a second side of each spring cup retainer plate. The common dispensing passage axially extending through the plates. The spring cup retainer plate houses a plurality of springs and spring cups. Each diaphragm back flow prevention valve includes the spring cup abutting against a respective diaphragm with the spring biasing the spring cup and diaphragm to a closed position against a discharge outlet seat. Each diaphragm is seated about its periphery between the spring cup retainer plate and the manifold plate. The manifold plate has a respective inlet passage in continuous communication with the diaphragm about the discharge outlet seat. The common dispensing passage is in selective fluid communication with the respective inlet passage when the diaphragm is in an open position with respect to the discharge outlet seat.

In one embodiment, the common dispensing outlet passage is at a radial center of the housing. The diaphragm back flow prevention valves are circumferentially spaced about the common dispensing outlet passage and being equidistant from the common dispensing outlet passage. The inlet passages are all at the same axial level on the manifold plate.

In accordance with another aspect of the invention, a back flow prevention valve has a housing with an inlet passageway terminating at a pressure chamber. A diaphragm valve element is mounted in the pressure chamber and has its periphery sealingly mounted between opposing seating shoulders in the housing. The diaphragm valve element is biased to close on a discharge outlet seat but openable away from the discharge outlet seat if pressure in the pressure chamber from the inlet passage overcomes the diaphragm valve bias to the closed position. Preferably, the housing includes a manifold plate and closure plate with the opposing seating shoulders being on the manifold plate and the closure plate. The closure plate has a bore for a spring cup retainer and a spring which abuts and biases the diaphragm to the closed position.

BRIEF DESCRIPTION OF THE DRAWINGS

Reference now is made to the accompanying drawings in which:

FIG. 3 is an exploded perspective view of the valve shown in FIG. 1;

DETAILED DESCRIPTION OF THE PREFERRED EMBODIMENT

Figure 1:
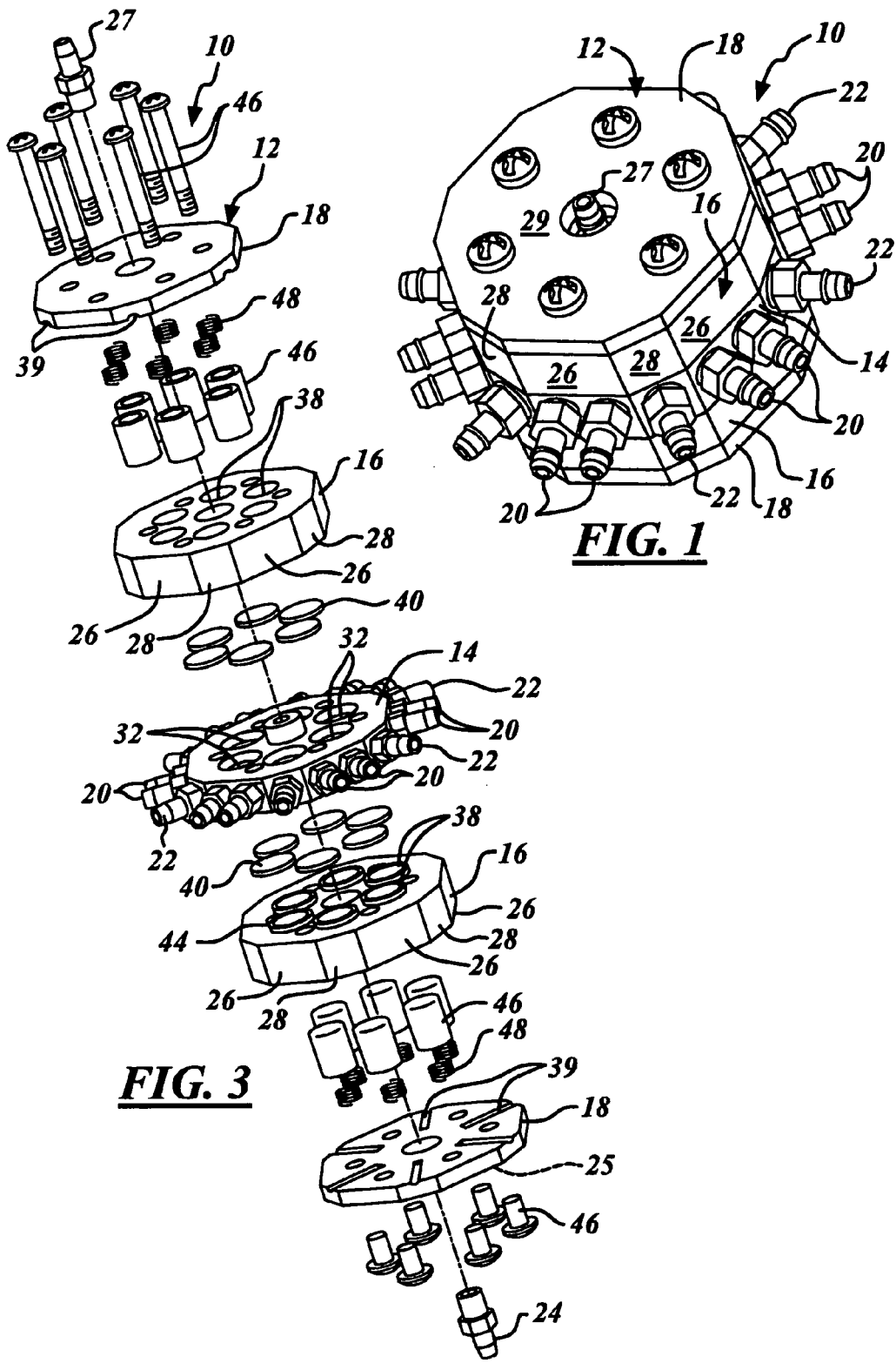
FIG. 1 is a perspective view of a dispensing valve assembly in accordance with one embodiment of the invention.
Figure 2:
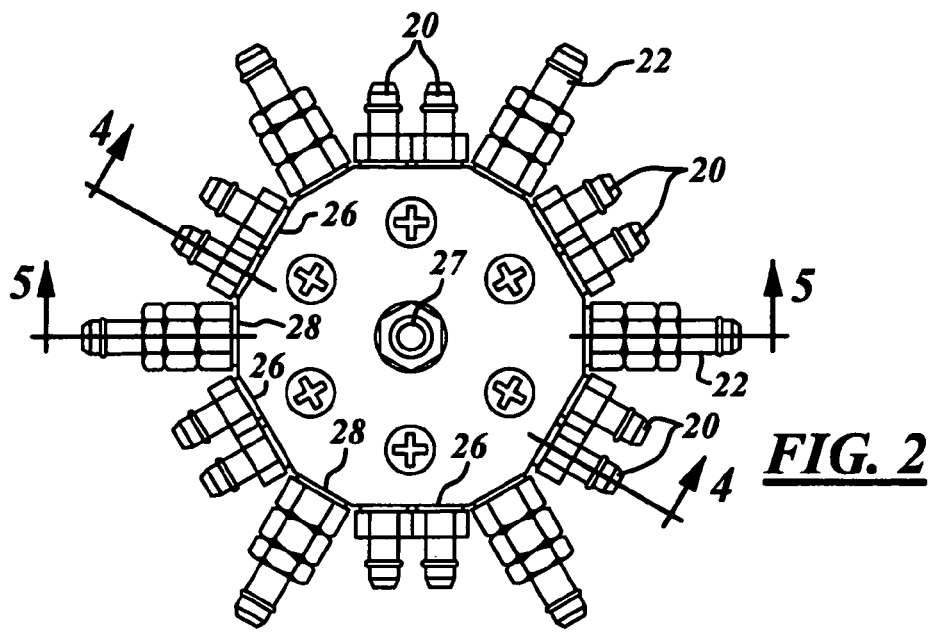
FIG. 2 is a top plan view of the valve shown in FIG. 1.

Referring now to FIGS. 1 and 2, a dispensing valve assembly 10 for dispensing a selection such as different flavors has a housing 12. The housing 12 has a generally polygonal shape with twelve sides but other shapes such as polygons with a different number of sides or a cylindrical shape are also acceptable. The housing 12 has a sandwich construction with a central manifold plate 14 and spring cup retainer plates 16 mounted on each axial end of the manifold plate 14. Cap plates 18 are then mounted on the outer ends of the spring cup retainers 16.

Figure 4:
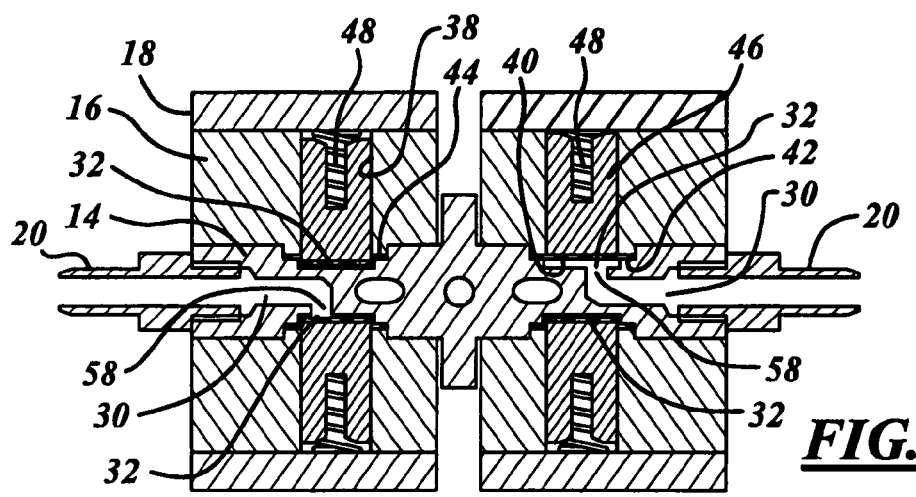
FIG. 4 is a cross-sectional view taken along lines 4-4 shown in FIG. 2.
Figure 5:
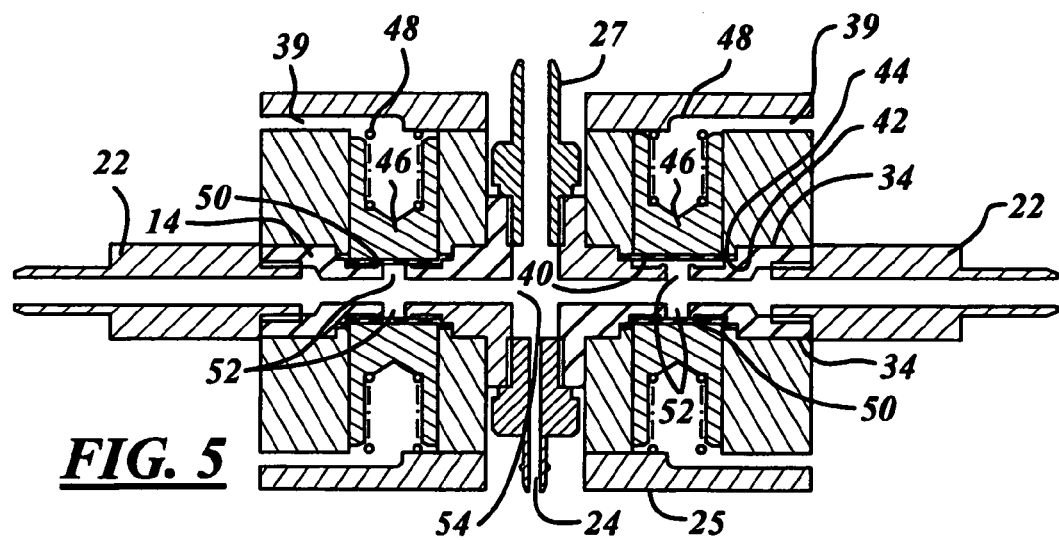
FIG. 5 is a cross-sectional view taken along lines 5-5 shown in FIG. 2.

A plurality of supply inlets 20 and a plurality of flush inlets 22 are circumferentially positioned about the manifold plate 14. A dispensing outlet 24 as shown in FIGS. 3-5 is located centrally on the bottom side 25 of the housing 12. An additional flush inlet 27 is located on the top side 29 of the housing. Preferably two supply inlets 20 are on a side 26 and a single flush inlet 22 is on alternating sides 28 of the housing 12.

Referring now to FIG. 4, each inlet 20 has a supply passage 30 that leads to a pressure chamber 32 in the manifold plate. The pressure chambers 32 are at each end 34 of the manifold plate 12 and are also circumferentially arranged within the manifold plate. The chambers 32 at each end 34 are axially aligned. As shown in FIGS. 4 and 2, spring cup retainer plates 16 also have circumferentially spaced bores 38 therein aligned with the chambers 32. The chambers 32 have a smaller diameter such that a seating edge 42 is about chamber and seals a diaphragm 40 against a corresponding rim 44 in cup retainer plate 16.

The sandwich construction of the housing 12 is secured by threaded fasteners 46 which tighten the cap plates 18, cup retainer plates 16 and manifold plate 14 into a secure assembly. The periphery of the diaphragm 40 is engaged by the cup retainer and manifold plates 16, 14 in a sealed manner against leakage. The cap plates 18 have vent grooves 39 to allow venting the coil spring side of the cups 46 as the cups move within bores 38 to alleviate any resisting pressure build up.

Referring to FIGS. 4 and 5, the diaphragm 40 is flexible enough to move between an open position as illustrated by the upper right diaphragm of each figure and a closed position as indicated by the other three diaphragms. As shown, in the closed position, the diaphragm abuts against a raised annular valve outlet seat 50 that has an outlet 52 therethrough. The retainer cups 46 are spring biased by coil springs 48 which move the diaphragm to the closed position against the valve seat 50. However, when pressure is exerted in passage 30, the pressure is communicated to pressure chamber 32 to act on the diaphragm 40 with sufficient force to move the diaphragm to an open position against the spring bias force exerted through the spring cups 46 by the coil springs 48. The opening of the diaphragm 40 allows fluid to then pass through the open outlet 52 and into outlet passage 54 which radially extends to the central axial dispensing outlet 24.

Figure 6:
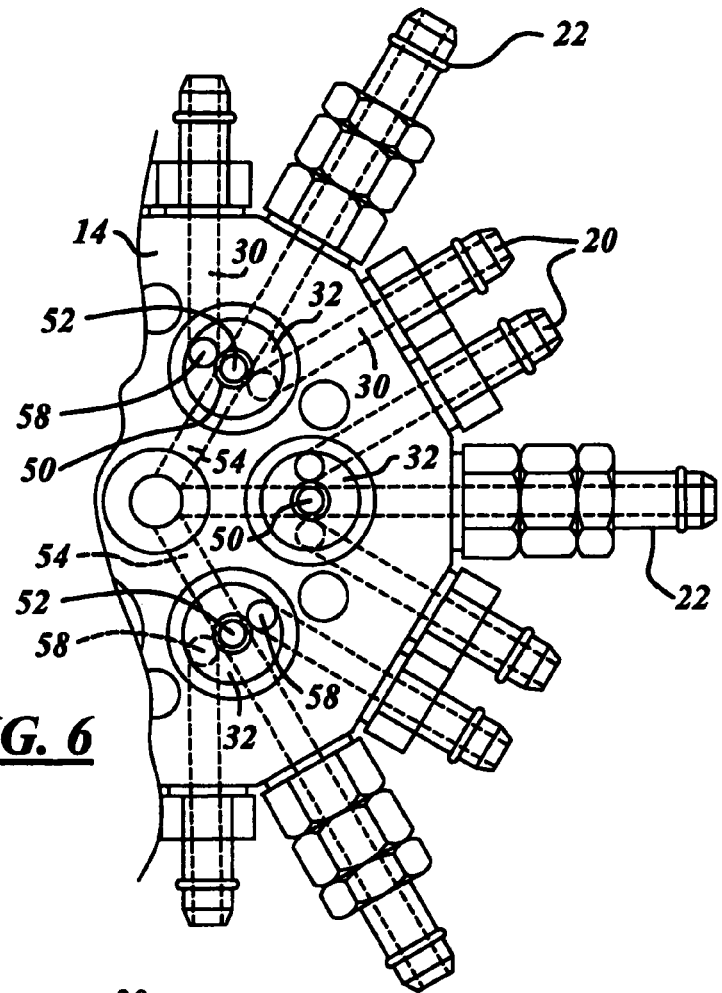
FIG. 6 is an enlarged fragmentary plan view of the manifold plate shown in FIG. 3.

As shown in FIGS. 5 and 6, each pressure chamber 32 has the outlet passage 54 centrally located with respect to the pressure chamber 32. As shown in FIGS. 4 and 6, the supply inlets 20 terminate in open communication with pressure chamber 32 through an off center aperture 58.

In operation, each supply inlet 20 is connected to a different supply source, for example a different flavored syrup for ice cream that is connected to a conventional displacement pump (not shown). The flush inlets 22 are all connected to an actuable air pressure supply. When a flavor is selected, the appropriate pump is turned on which supplies the selected syrup through the supply inlet 20 and into pressure chamber 32 which opens the diaphragm 40 and passes through the outlet passage 54 and to dispensing outlet 24. Air pressure is turned on and flows through inlets 22 and 27 to help assist the movement of the syrup.

When the pump for supply inlet 20 is turned off, the diaphragm closes due to the bias of spring 48. Increased air pressure then passes through inlets 22 and 27 and to the outlet passage 54 to flush clean the lines of any syrup. The coil spring 48 has sufficient force to resist the force of the air pressure from undesirably opening the diaphragm 40.

The valve according the embodiment shown in FIGS. 1-6 can also be used with a plurality of gravity fed supplies all located above the valve and preferably at the same height. Secondly, preferably the short outlet passages 54 all have the same length which improves the timing of the dispensing of the flavored syrup. The air pressure assist during dispensing is particularly helpful for flavors with a greater viscosity such as mocha or chocolate. The higher air pressure flush after the dispensing of a syrup flavor also is improved due to the short distance needed to flush each flavor. The diaphragm valve remains closed during the high pressure flush to prevent air from entering into the pressure chamber 32 or the supply inlets 20. Air is particularly undesirable for sugary supplies such as flavored syrups because entry of air will cause the syrup sugars to crystallize within the inlet passage 30.

Figure 7:
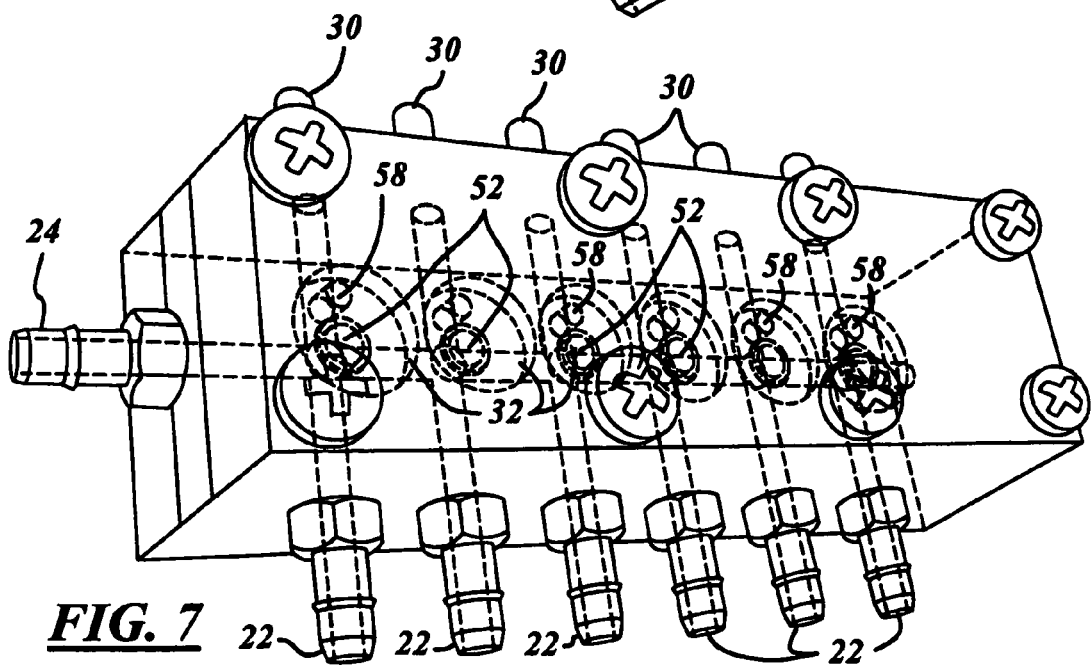
FIG. 7 illustrates another embodiment of the invention.

While the above described embodiment with a rotary shaped housing assembly has certain advantages, the diaphragm valve construction of the invention can be applied to other shaped housing valve assemblies such as the linear valve 60 shown in FIG. 7. In this embodiment the internal positioned pressure chamber 32, diaphragm, spring cups and coil springs all have the same construction and operate in the same fashion as in the first embodiment. The most substantial difference is that the pressure chambers are linearly arranged and the supply inlets 20 have different effective distances from each outlet 52 to the dispensing outlet 24 for each pressure chamber 32.

Other variations and modifications are possible without departing from the scope and spirit of the present invention as defined by the appended claims.

The embodiments in which an exclusive property or privilege is claimed are defined as follows:

1. A dispensing valve assembly with back flow protection, said dispensing valve assembly comprising:
   a housing having a plurality of inlet passageways connectable at a respective upstream end to a respective supply source;
   each of said inlet passageways being in communication with a pressure responsive valve element;
   said valve element being yieldably biased to a closed position abutting a discharge valve seat communicating with an outlet passage, with said valve element being moveable to an open position when pressure in said respective inlet passageway exceeds a predetermined value;
   each outlet passage being in fluid communication with a common dispensing outlet; and
   each outlet passage having a respective flush inlet connected thereto for connection to a flushing air pressure supply that simultaneously flushes all of such said outlets from a downstream side of said respective valve elements through said common dispensing outlet.

2. A dispensing valve assembly as defined in claim 1 further comprising:
   said plurality of inlet passageways being circumferentially spaced about said common dispensing outlet and radially extending outwardly therefrom; and
   the distances from said common dispensing outlet to said respective upstream ends of said outlet passages being approximately equal.

3. A dispensing valve assembly as defined in claim 2 further comprising:
   said valve element comprising a diaphragm; and
   said inlet passageways terminating at and in fluid communication with a pressure chamber that seats said diaphragm, said pressure chamber also receiving said discharge valve seat.

4. A dispensing valve assembly as defined in claim 3 further comprising:
   said housing constructed such that the common dispensing outlet is at an axial end of said housing and said inlet passageways are disposed circumferentially about said housing transverse to said common dispensing outlet; and
   said diaphragm having its outer periphery mounted between two seating shoulders of said housing.

5. A dispensing valve assembly as defined in claim 1 further comprising:
   said valve element comprising a diaphragm; and
   said inlet passageways terminating at and in fluid communication with a pressure chamber that seats said diaphragm, said pressure chamber also receiving said discharge valve seat.

6. A dispensing valve assembly with back flow protection, said dispensing valve assembly comprising:
   a housing having a plurality of inlet passageways connectable at a respective upstream end to a respective supply source;
   each of said inlet passageways being in communication with a pressure responsive valve element;
   said valve element being yieldably biased to a closed position abutting a discharge valve seat communicating with an outlet passage, with said valve element being moveable to an open position when pressure in said respective inlet passageway exceeds a predetermined value;
   each outlet passage being in fluid communication with a common dispensing outlet;
   said housing constructed such that the dispensing outlet is at an axial end of said housing and said inlet passageways are disposed circumferentially about said housing transverse to said dispensing outlet;
   said valve elements each being a diaphragm seated in a respective pressure chamber at a downstream end of each inlet passageway; and
   pairs of said chambers circumferentially spaced about in said housing with each pressure chamber in a respective pair being axially spaced from each other with a pair of passageways interposed between each of said pairs of axially spaced pressure chambers.

7. A dispensing valve as defined in claim 6 further comprising:
   said diaphragm having its outer periphery mounted between two seating shoulders of said housing.

8. A dispensing valve assembly with back flow prevention, said dispensing valve assembly comprising:
   a housing having a common dispensing outlet;
   a plurality of diaphragm backflow prevention valves carried by said housing and each having a discharge outlet in fluid communication with said common dispensing outlet and an inlet in communication with separate supply ports; and
   each discharge outlet having at its upstream end a flush inlet for connection to a pressurized fluid supply for flushing each discharge outlet and said common dispensing outlet when said plurality of diaphragm backflow prevention valves are in a closed position.

9. A dispensing valve assembly as defined in claim 8 further comprising:
   said housing including a manifold plate;
   a spring cup retainer plate on each axial side of said manifold plate and having a first side abutting said manifold plate;
   a cap plate abutting a second side of each spring cup retainer plate;
   said common dispensing passage axially extending through said plates;
   said spring cup retainer plate housing a plurality of springs and spring cups;
   each diaphragm back flow prevention valve including one of said spring cups abutting against a respective diaphragm with said respective spring biasing said one spring cup and diaphragm to a closed position against a discharge outlet seat;
   each respective diaphragm being sealably seated about its periphery between said spring cup retainer plate and said manifold plate;
   said manifold plate having a respective inlet passage in continuous communication with said diaphragm about said discharge outlet seat; and
   said common dispensing passage in selective fluid communication with a said respective inlet passage when said diaphragm is in an open position with respect to said discharge outlet seat.

10. A dispensing valve assembly as defined in claim 9 further comprising:
    said common dispensing outlet passage being at a radial center of said housing;
    said diaphragm back flow prevention valves being circumferentially spaced about said common dispensing outlet passage and being equidistant from said common dispensing outlet passage; and
    said inlet passages being all at the same axial level on said manifold plate.

11. A dispensing valve assembly as defined in claim 2 further comprising:
    said outlet passages being circumferentially spaced about said common dispensing outlet and radially extending outward therefrom; and
    said respective flush inlet being connected at a radially outer end of a respective outlet passage.

12. A dispensing valve assembly with back flow prevention, said dispensing valve assembly comprising:
    a housing having a common dispensing outlet;
    a plurality of diaphragm backflow prevention valves carried by said housing and each having a discharge outlet in fluid communication with said common dispensing outlet and an inlet in communication with separate supply ports;
    said housing including a manifold plate;
    a spring cup retainer plate on each axial side of said manifold plate and having a first side abut said manifold plate;
    a cap plate abutting a second side of each spring cup retainer plate;
    said common dispensing passage axially extending through said plates;
    said spring cup retainer plate housing a plurality of springs and spring cups;
    each diaphragm back flow prevention valve including one of said spring cups abutting against a respective diaphragm with said respective spring biasing said one spring cup and diaphragm to a closed position against a discharge outlet seat;

each respective diaphragm being sealably seated about its periphery between said spring cup retainer plate and said manifold plate;

said manifold plate having a respective inlet passage in continuous communication with said diaphragm about said discharge outlet seat; and said common dispensing passage in selective fluid communication with a said respective inlet passage when said diaphragm is in an open position with respect to said discharge outlet seat.

13. A dispensing valve assembly as defined in claim 12 further comprising:

said common dispensing outlet passage being at a radial center of said housing;

said diaphragm back flow prevention valves being circumferentially spaced about said common dispensing outlet passage and being equidistant from said common dispensing outlet passage; and said inlet passages being all at the same axial level on said manifold plate.

\* \* \* \* \*